(12) United States Patent
Sinha et al.

(10) Patent No.: US 10,969,179 B2
(45) Date of Patent: Apr. 6, 2021

(54) SYSTEMS AND METHODS FOR EXCHANGING THERMAL ENERGY BETWEEN A DRAIN LIQUID AND A SOURCE LIQUID FOR HEATING OR COOLING

(71) Applicants: Sunil Sinha, Katy, TX (US); Gopal Basak, Katy, TX (US)

(72) Inventors: Sunil Sinha, Katy, TX (US); Gopal Basak, Katy, TX (US)

(*) Notice: Subject to any disclaimer, the term of this patent is extended or adjusted under 35 U.S.C. 154(b) by 70 days.

(21) Appl. No.: 16/159,651

(22) Filed: Oct. 13, 2018

(65) Prior Publication Data

US 2020/0116438 A1    Apr. 16, 2020

(51) Int. Cl.
| | |
|---|---|
| *F28D 21/00* | (2006.01) |
| *F24D 3/18* | (2006.01) |
| *F24D 11/02* | (2006.01) |
| *F24H 4/02* | (2006.01) |
| *F25B 39/04* | (2006.01) |
| *F28D 7/00* | (2006.01) |

(52) U.S. Cl.
CPC ........... *F28D 21/0012* (2013.01); *F24D 3/18* (2013.01); *F24D 11/0214* (2013.01); *F24H 4/02* (2013.01); *F24D 2200/20* (2013.01); *F25B 39/04* (2013.01); *F28D 7/0066* (2013.01)

(58) Field of Classification Search
CPC ..... F28D 21/0012; F24D 3/18; F24D 11/0214
USPC .......................................................... 62/98
See application file for complete search history.

(56) References Cited

U.S. PATENT DOCUMENTS

| | | | |
|---|---|---|---|
| 4,410,791 A | 10/1983 | Eastep | |
| 4,821,793 A | 4/1989 | Sheffield | |
| 5,740,857 A | 4/1998 | Thompson et al. | |
| 5,791,401 A | 8/1998 | Nobile | |
| 6,640,048 B2 | 10/2003 | Novotny et al. | |
| 6,722,421 B2 | 4/2004 | MacKelvie | |
| 7,096,885 B2 | 8/2006 | Van Decker | |
| 7,322,404 B2 | 1/2008 | Van Decker et al. | |
| 7,543,456 B2 | 6/2009 | Sinha | |
| 8,752,614 B2 | 6/2014 | Uhrig | |
| 10,345,004 B1* | 7/2019 | Hern | F24H 4/04 |
| 2004/0131346 A1 | 7/2004 | Chamberlain, Jr. | |
| 2006/0137349 A1* | 6/2006 | Pflanz | F03G 6/045 |
| | | | 60/641.2 |
| 2010/0000709 A1* | 1/2010 | Chang | F25B 29/003 |
| | | | 165/58 |
| 2012/0312035 A1* | 12/2012 | Boucher | F25B 40/02 |
| | | | 62/99 |
| 2013/0255297 A1* | 10/2013 | Matsuoka | F24F 11/30 |
| | | | 62/180 |
| 2016/0061508 A1* | 3/2016 | Lowrimore | F24D 19/1006 |
| | | | 62/160 |

* cited by examiner

*Primary Examiner* — Henry T Crenshaw
(74) *Attorney, Agent, or Firm* — Egbert, McDaniel & Swartz, PLLC

(57) ABSTRACT

Systems and methods are disclosed for exchanging thermal energy between a drain liquid and a source liquid for heating or cooling of the source liquid. One method for heating a source liquid may involve transferring heat from a drain liquid using a heat pump. A system may include a refrigerant, a source liquid and a drain liquid, two or more heat exchangers that facilitate an exchange of thermal energy, and a means for transporting the refrigerant.

18 Claims, 13 Drawing Sheets

SYSTEMS AND METHODS FOR EXCHANGING THERMAL ENERGY BETWEEN A DRAIN LIQUID AND A SOURCE LIQUID FOR HEATING OR COOLING

FIELD

Various embodiments of the present disclosure relate generally to heat pump, liquid heating or cooling, and related methods. More specifically, embodiments of the present disclosure relate to systems and methods for exchanging thermal energy between a drain liquid and a source liquid.

BACKGROUND

Heat Pumps have been popular for heating and cooling air inside a building. A heat pump may include, for example, an evaporator and a compressor that assist in the transformation of a fluid. However, heat pump-based technologies have not been as successful in to heat water. One reason that heat pump-based technologies have failed is because evaporators may often freeze, which blocks air flow and prevents efficient heat transfer. Another reason for failure includes a failure of the compressor to perform properly. Other challenges include a high cost of maintenance associated with management of evaporator freezing controls e.g. a refrigerant reversible valve, which also becomes ineffective in subfreezing ambient temperature, and the issue of loud noises arising from the fan of the heat pump. Thus, a desire exists for a system and method that may be useful for heating water or any liquid using heat pump that addresses one or more of the abode-described shortcomings. Furthermore, another desire exists to cool water or any other liquid in the hot climatic zones using heat pump. Furthermore another desire exists to heat and cool any liquid on demand without storing the liquid.

SUMMARY

The foregoing general description and the following detailed description are exemplary and explanatory only and are not restrictive of the disclosure. The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below. According to certain aspects of the present disclosure, systems and methods are disclosed for exchanging thermal energy between a drain liquid and a source liquid for heating or cooling using heat pump.

Systems, apparatuses, devices, and methods are described for a drain based liquid heating and cooling. In accordance with an exemplary embodiment, one system may comprise: a refrigerant; a source liquid and a drain liquid. There may be, initially or at after use of the source liquid, a temperature difference between the source liquid and the drain liquid. The system may further comprise two or more heat exchangers, including, e.g., a first heat exchanger that facilitates an exchange of thermal energy from the drain liquid to the refrigerant, and a second heat exchanger that facilitates an exchange of thermal energy from the refrigerant to the source liquid. There may be a means for transporting the refrigerant in a cyclical pathway (e.g., a coil). The system may further comprise of a compressor that heats the refrigerant via compression, and an expansion valve that cools the refrigerant via expansion. The cyclical pathway traversed by the refrigerant (e.g., through the coil) may include, for example, the two or more heat exchangers, the compressor and the expansion valve.

The first heat exchanger may be an evaporator chamber comprising of an evaporator, and at least an inlet for the drain liquid (e.g., for embodiments in which a volume of the drain liquid is stored, e.g., as a reservoir, in the evaporator chamber). The evaporator chamber may also further comprise an outlet for the drain liquid (e.g., for embodiments in which the drain liquid flows through the evaporator chamber by entering the inlet and exiting the outlet). Furthermore, the second heat exchanger may be a condenser chamber, comprising of a condenser, and at least an inlet for the source liquid (e.g., for embodiments in which a volume of the source liquid is stored, e.g., as a reservoir, in the condenser chamber). The condenser chamber may also further comprise an outlet for the source liquid (e.g., where the source liquid flows through the evaporator chamber by entering the inlet and exiting the outlet).

The means for transporting the refrigerant in a cyclical pathway may involve a coil spanning the cyclical pathway. The coil may include, e.g., as one or more segments of its cyclical pathway, the compressor and the expansion valve.

In some embodiments, the source liquid may become at least a part of, or the entirety of, the drain liquid after use. For example, a user may turn the faucet on to wash her hands, bringing source liquid to wash away dirt, and forming a drain liquid comprising of the used source liquid and the dirt.

In some embodiments, the system may further include a refrigerant filter. Furthermore, the system may comprise of sensors, controllers, and/or displays to measure, control, and/or display, respectively, various metrics of the system. The metrics may include, for example, a temperature, a pressure, and/or a flow rate within various components of the system, e.g., the means for carrying the source liquid or the drain liquid, the cyclical pathway, coil, the heat exchangers, the compressor, the expansion valve, etc.

In various embodiments, a part of the system that includes, e.g., the refrigerant, the means for transporting the refrigerant, the compressor, the expansion valve, and the heat exchangers, may be a heat pump. However, in some embodiments, these subcomponents may be used as described herein, independent of a heat pump.

In some embodiments, the one or more components (e.g., compressor) of system described herein (whether as part of a heat pump or otherwise) may be powered on by an electric source on demand. The electric source may be a renewable energy source (e.g., solar powered). A rechargeable battery may store electricity from the renewable energy source, which may provide electricity in alternating current (AC) or direct current (DC). An inverter may be used as part of the system. Furthermore, a reversing valve to reverse the flow of the refrigerant, e.g., automatically or by manual input.

In accordance with a further embodiment of the present disclosure, methods are disclosed for assembling a drain liquid based liquid heater. For clarity, the method may be implemented on standalone residential, commercial, and industrial facilities that utilize a source liquid (e.g., water expelled from a water faucet that for use), a drain liquid (waste water expelled from a sink corresponding to the water faucet), and conventional water heaters. For clarity, the drain liquid based liquid heater being assembled may be like one of the systems described above. One method for assembling the drain liquid based liquid heater may include: identifying a cold water source that delivers cold water, a water heater that heats the cold water from the cold water to form hot water, a first conduit that enables the flow of cold water from the cold water source to the water heater, a second conduit that enables the flow of hot water from the water heater to an outlet for the source liquid (e.g., a water faucet, shower hose, etc.) and a third conduit that enables the flow of a drain liquid from an inlet (e.g., a sink). The method may further include bifurcating or diverting the first conduit so that it enables the flow of the cold water from the cold water source to a heat exchanger of the drain liquid based liquid heater, e.g., the second heat exchanger of the drain liquid based liquid heating system described above. The method may further include bifurcating or diverting the second conduit so that it enables the flow of the hot water from the said heat exchanger to the opening for the source liquid (e.g., water faucet). Furthermore, the third conduit may be altered so that it enables the flow of the drain liquid through the another heat exchanger of the drain liquid based liquid heater (e.g., the first heat exchanger of the drain liquid based liquid heating systems described above). The source liquid may be one or more of the cold water, the hot water, or a mixture of the cold water and the hot water. The source liquid becomes at least a part of, or the entirety of, the drain liquid after use.

In some embodiments, the method may further include activating the transporting of the refrigerant through the cyclical pathway of a drain liquid based liquid heating system described above. The activation may be powered by an electric source.

In accordance with a further embodiment of the present disclosure, methods are disclosed for drain liquid based liquid heating or cooling. The method may be performed by or using one or more components of the systems described above. One method may include activating the transporting of a refrigerant through a cyclical pathway comprising of two or more heat exchangers, the compressor, and the expansion valve, wherein the activation is powered by an electric source. For example, a heat pump comprising of the above-described component may be activated, e.g., by turning on a power. The two or more heat exchangers comprises of at least a first heat exchanger and a second heat exchanger. The compressor may heat the refrigerant via compression, and the expansion valve may cool the refrigerant via expansion. The method may further comprise: receiving, at the second heat exchanger, a flow or a volume of the source liquid that is desired by a user to be heated.

The method may further comprise enabling, at an outlet for the source liquid, the flow of the source liquid for use by the user. For example, a faucet may be turned on, allowing water (a liquid) to flow for use by a user seeking to wash hands. The method may further comprise enabling the flow of the drain liquid at an inlet for the drain liquid, wherein the source liquid becomes at least a part of, or the entirety of, the drain liquid after use. For example, a sink may collect the used water after the user washes her hands, and the sink may send this used water (drain liquid) through a drain. The method may further comprise receiving, at the first heat exchanger, a flow or a volume of the drain liquid; facilitating the exchange of heat from the flow or the volume of the drain liquid to the refrigerant at the first heat exchanger; and facilitating the exchange of heat from the refrigerant to the flow or the volume of the source liquid received at the second heat exchanger.

In some embodiments, the method may include enabling, at an outlet for the source liquid, the flow of the source liquid having heat from the refrigerant. For example, a user may now receive hot water as a result of the above-described steps being performed.

These and additional aspects will be appreciated with the benefit of the disclosures discussed in further detail below.

BRIEF DESCRIPTION OF THE DRAWINGS

The accompanying drawings, which are incorporated in and constitute a part of this specification, illustrate various exemplary embodiments, and together with the description, serve to explain the principles of the disclosed embodiments.

For simplicity and clarity of illustration, elements in the figures here are not necessarily drawn to the scale. For example, the dimensions of some elements may be magnified when compared to other elements for clarity. Further, where considered appropriate, reference labels have been repeated among the figures to indicate corresponding or similar elements.

DETAILED DESCRIPTION OF THE EMBODIMENTS

Figure 1:
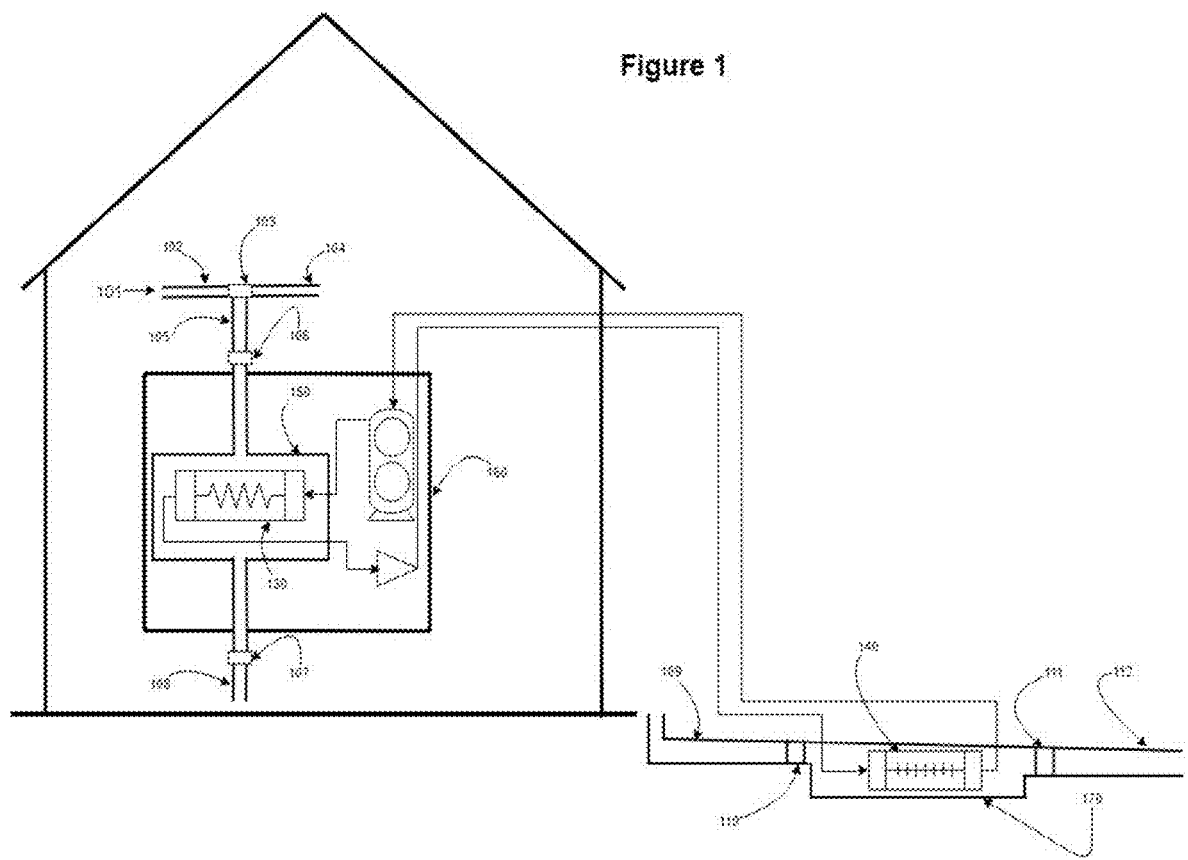
FIG. 1 depicts a pictorial and graphical diagram of a drain liquid based liquid heater for a building e.g., residential, commercial, industrial, institutional etc, according to an exemplary embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

This discussion should not be construed, however, as limiting the invention to those particular embodiments; practitioners skilled in the art will recognize numerous other embodiments as well. For definition of the complete scope of the disclosure, the reader is directed to appended claims.

Various embodiments of the present disclosure describe novel and nonobvious methods, systems and apparatuses of heating or cooling liquid. In some embodiments, a heat pump or heat pump facility may transfer thermal energy between a source liquid that may be used by a user ("source liquid") and a drained waste liquid ("drain liquid"). The heat pump or heat pump facility may include one or more of a compressor, a condenser, an evaporator, a refrigerant, a refrigerant expansion valve, and a refrigerant filter, and a means for carrying the refrigerant in a cycle traversing the compressor, the condenser, the expansion valve and the evaporator. The condenser may be enclosed in a condenser chamber and the evaporator may be enclosed in an evaporator chamber. In various embodiments, the condenser chamber or the evaporator chamber, having a means to allow a flow or volume of liquid in for heat exchange, may be referred to as a heat exchanger. The said means may include, for example, an inlet for a source liquid or drain liquid to flow in or for a volume of the source liquid or drain liquid to collect (e.g., as a reservoir) before it overflows. The said means may additionally include an outlet for the source liquid or drain liquid to flow out from the heat exchanger.

The compressor may heat the refrigerant via compression and the expansion valve may cool the refrigerant via expansion. In some embodiments, the evaporator chamber may include a drain liquid inlet and a drain liquid outlet for heating the source liquid, and the condenser chamber may include a cold liquid inlet and a hot liquid outlet for heating the source liquid. In further embodiments, the evaporator chamber may include a hot source liquid inlet and cold source liquid outlet for cooling the source liquid, and the condenser chamber may include a hot liquid inlet and cold liquid outlet for cooling the source liquid.

In some embodiments, in addition to or as an alternative to an expansion valve, another pressure-lowering device may be used (e.g., metering device, capillary tube, a work-extracting device, a turbine, etc.).

Some embodiments have applications in residential and commercial buildings, and industrial processes. For example, in residential applications, some embodiments of the present disclosure can be used in central water heating. Some aspects can also be used as point of use applications in washroom sinks, showers and kitchen sinks. In commercial settings, some embodiments described herein can be used for central water heating and cooling. Some aspects of the present disclosure can also be used as point-of-use applications as in commercial wash basins, common showers, kitchens, dishwashers, cloth washers, etc. In industrial settings, some embodiments of the present disclosure can be used for heating and cooling of various liquids used in food and beverage processing, e.g., milk, alcohol, water, chemicals etc.

The liquid to liquid heat pump can facilitate a heat transfer between two liquids, e.g., Liquid "A" and Liquid "B", through the use of a refrigerant. In some embodiments, a refrigerant may be volatile evaporating and condensing fluid, in its gaseous state, which may be pressurized and circulated through the system, e.g., by a compressor. The refrigerant can travel through a means for carrying the refrigerant in a cycle (e.g., "cyclical pathway") traversing the compressor, the condenser, the expansion valve and the evaporator. the means may include, but are not limited to, a coil, a pipe, a pathway through various chambers (e.g., a condenser chamber, an evaporator chamber, etc.), a conduit, or a continuous space. As the refrigerant travels through these means, the temperature of the refrigerant may rapidly change depending on how the refrigerant is altered. For example, as the refrigerant travels through the compressor, the compression of the refrigerant caused by the compressor may rapidly heat up the refrigerant. The resulting hot and pressurized refrigerant may enter the condenser chamber where the heat exchanger carrying the refrigerant may come in contact with cold Liquid "A" from the supply line. Heat transfer may occur between the heated refrigerant and the Liquid "A," resulting in hot liquid.

Likewise, the coil carrying the refrigerant may enter an expansion valve, where expansion of the refrigerant caused by the expansion valve may rapidly cool down the refrigerant. The resulting cold refrigerant may enter the evaporator chamber where the heat exchanger carrying the refrigerant may come in contact with Liquid "B" from the liquid input line. Heat transfer may occur between the cold refrigerant and the Liquid "B", resulting in a flow of heat from the liquid to the refrigerant.

The process of heat transfer in the evaporator chamber may allow for the cool refrigerant to warm up before it enters into the compressor for raising its pressure and temperature.

In some embodiments, e.g., for heating liquids, Liquid "A" can be the source liquid and Liquid "B" can be the drain liquid. For examples, liquid B can be a drained water or waste water. In some embodiments, e.g., for cooling liquids, Liquid "A" can be the drain liquid and Liquid "B" can be the source liquid. For examples, liquid A can be a drained water or waste water.

FIG. 1 depicts a pictorial and graphical diagram of a drain liquid based liquid heater for a building e.g., residential, commercial, industrial, institutional etc., according to an exemplary embodiment of the present disclosure. Furthermore, while FIG. 1 depicts an exemplary embodiment for heating a source liquid using thermal energy extracted from the drain liquids of a building e.g., residential, commercial, industrial, institutional etc., FIG. 2 and FIG. 3 depict exemplary embodiments for heating a source liquid in Point-of-Use (POU) applications and settings, e.g., in a kitchen sink, bathroom sink, shower, etc.

Figure 2:
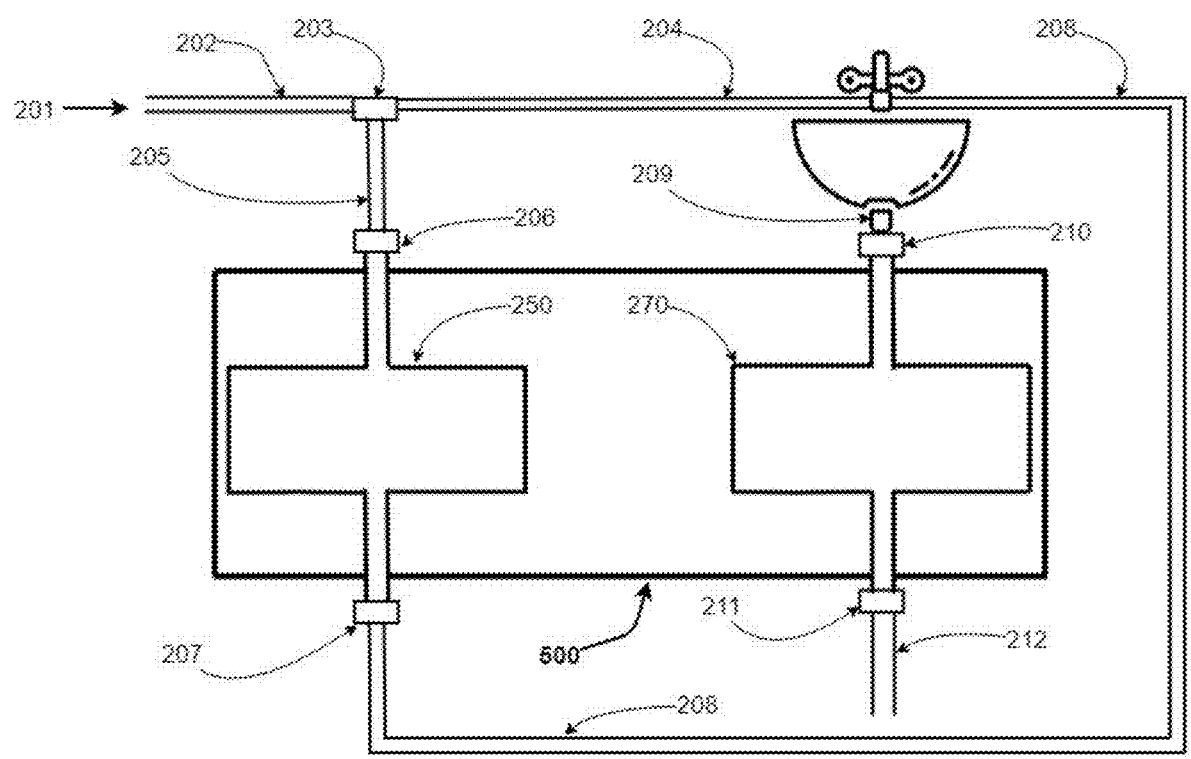
FIG. 2 depicts a pictorial and graphical diagram of a drain liquid based liquid (e.g., water) heater for a Point of Use (POU) application under a kitchen or bathroom sink, according to an exemplary embodiment of the present disclosure.
Figure 3:
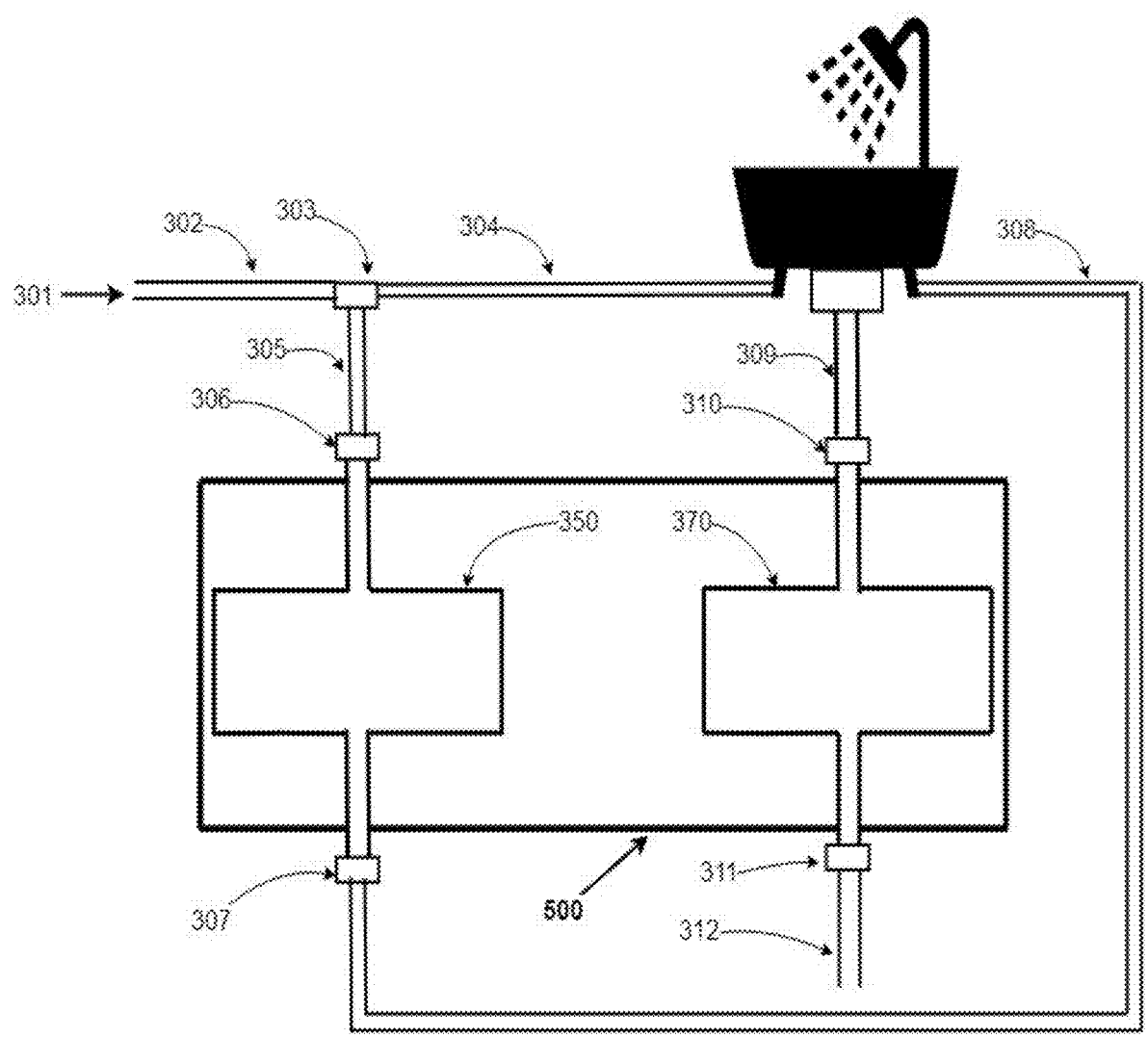
FIG. 3 depicts a pictorial and graphical diagram of the drain liquid based liquid (e.g., water) heater for a POU application in bathroom or community showers, according to an exemplary embodiment of the present disclosure.

Referring to FIGS. 1-3, the cold source liquid indicated by 101, 201 and 301 may be supplied through a cold liquid supply line (102, 202 and 302). At junction (103, 203 and 303), the cold liquid supply line may bifurcate. One cold liquid supply line (104, 204 and 304) may supply cold liquid for use in the building, sink or shower. Another cold liquid supply line (105, 205 and 305) may lead to a cold liquid inlet (106, 206 and 306) of a condenser chamber (150, 250 and 350). As will be described in this section, the cold liquid may be heated to produce hot liquid that will leave the condenser chamber from a hot liquid outlet (107, 207 and 307). From this hot liquid outlet, the hot liquid supply line (108, 208 and 308) may take the hot liquid for use in the home or building, kitchen sink or bathroom sink, or in shower.

Drain liquid input line, indicated by 109, 209 and 309, may be a building's drain line and/or the line under a sink and/or shower of a kitchen and/or bathroom. The drain liquid input line may divert waste liquid after use into the drain liquid inlet (110, 210 and 310) of the evaporator chamber (170, 270 and 370). As will be described in this section, thermal energy may be extracted from the drain liquid. The cold drain liquid may be exported out through the drain liquid outlet (111, 211 and 311), into the drain liquid output line (112, 212 and 312).

Figure 4:
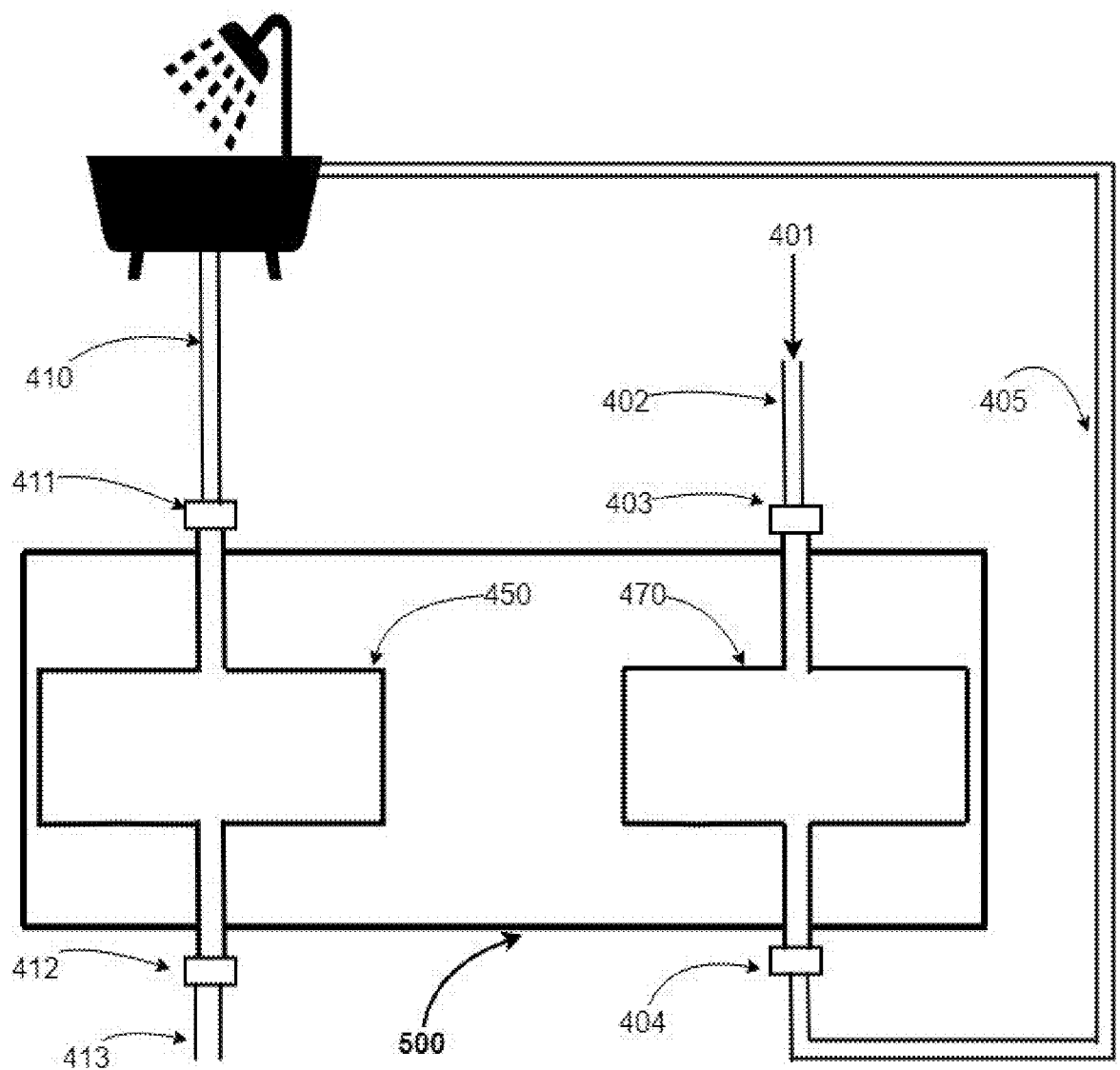
FIG. 4 depicts a pictorial and graphical diagram of the liquid (e.g., water) cooling system based on heat transfer from the drain liquid in a bathroom or community shower, according to an exemplary embodiment of the present disclosure.

FIG. 4 depicts a pictorial and graphical diagram of the liquid (e.g., water) cooling system based on heat transfer from the drain liquid in a bathroom or community shower, according to an exemplary embodiment of the present disclosure. The embodiment as depicted in FIG. 4 may be used for cooling the source liquid by transferring the thermal energy to the drain liquid in a shower.

The hot source liquid indicated by 401 may be supplied through a hot liquid supply line (402). This hot liquid may enter the evaporator chamber (470) at the junction (403). As will be described in this section, the hot liquid may be cooled to produce a cooler liquid ("cold liquid") that may leave the evaporator chamber (470) from a cold liquid outlet (404). From this cold liquid outlet, the cold liquid supply line (405) may deliver the cold liquid for use in the shower.

Figure 5:
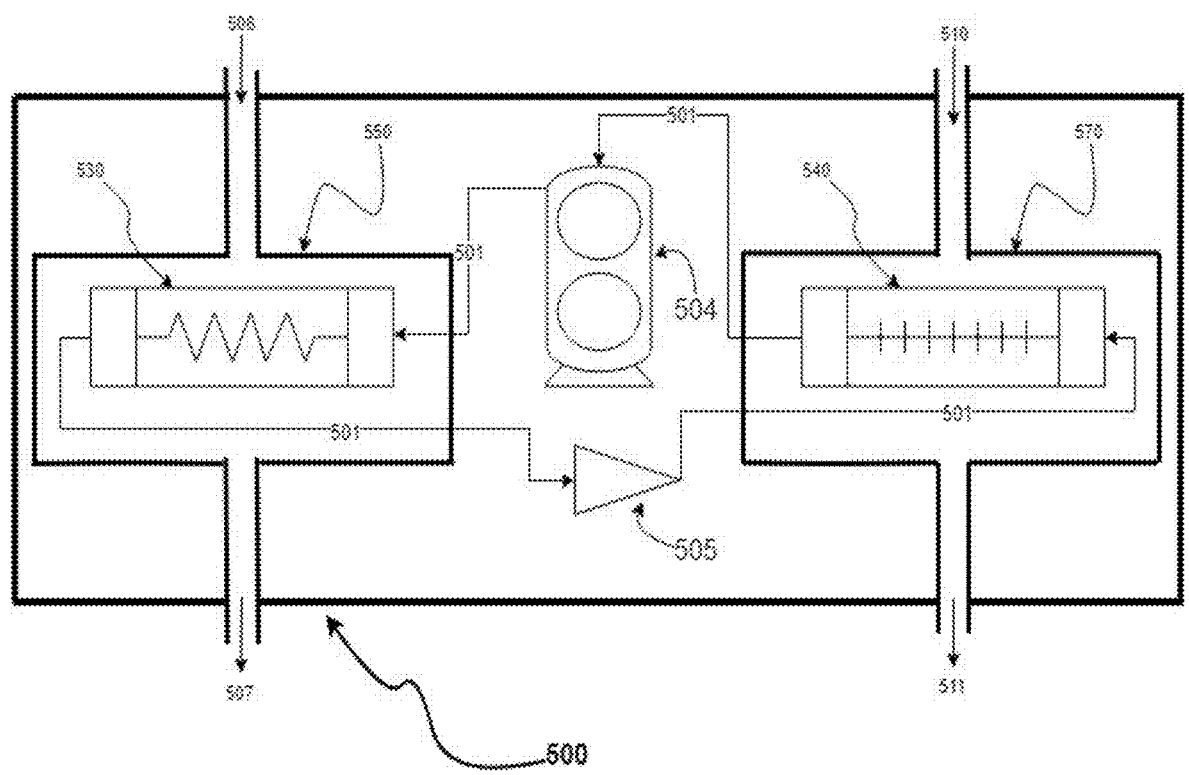
FIG. 5 depicts a pictorial and graphical diagram of the liquid to liquid heat pump device that is a component in all embodiments, according to an exemplary embodiment of the present disclosure. This component is illustrated as a rectangle and labeled as reference number '500' in FIG. 2, FIG. 3 and FIG. 4. The rectangle is broken down in two parts in FIG. 1 to indicate preferred locations of the components in one of the embodiments—one part (103) is located inside the building and the other part (102) is located outside the building.

Thermal transfer between two liquids, designated as liquid "A" and liquid "B" for simplicity, may be accomplished by at least one 'liquid to liquid heat pump' (500), e.g., as depicted in FIG. 5. The heat pump may include a refrigerant, which may be contained in, or included within, a closed or semi-closed system comprising of a compressor (504), coils (501) (or other means for transporting the refrigerant), a condenser (530) contained or included within a condenser chamber (550), an expansion valve (505) and an evaporator (540) contained or included within an evaporator chamber (570). In some embodiments, as in the systems depicted in FIGS. 2, 3 and 4 components of the heat pump are shown together (500), whereas in some embodiments, e.g., as in the system depicted in FIG. 1, the evaporator chamber (170, 570) is shown as being separate from the other components of the heat pump to indicate the evaporator chamber's location being outside the building.

When the refrigerant travels through the compressor (504), the high pressure compression may rapidly heat the refrigerant. The heated refrigerant carried within the coil (501) may enter the condenser (530). The cold inlet (506) may allow entry of the cold liquid "A" into the condenser chamber (550). There, the cold liquid "A" may come in contact with the condenser (530) containing the hot refrigerant. Heat transfer may occur between the heated refrigerant and the cold liquid "A". The heated liquid "A" may flow out of the hot liquid outlet (507).

When the refrigerant carried by the coil (501) enters the expansion valve (505), the expansion may rapidly cool the refrigerant. The resulting cold refrigerant carried by the coil (501) may enter the evaporator (540) in the evaporator chamber (570). The liquid inlet (510) may allow entry of the liquid "B" which may be hotter than the refrigerant. This liquid "B" may come in contact with the cold refrigerant within the evaporator (540). Heat transfer may occur between the cold refrigerant and the hotter liquid "B". This heat transfer may facilitate the flow of heat from the liquid "B" back into the cold refrigerant. Once the heat is extracted, the resulting cooler liquid "B" may flow out through the liquid outlet (511).

Figure 6:
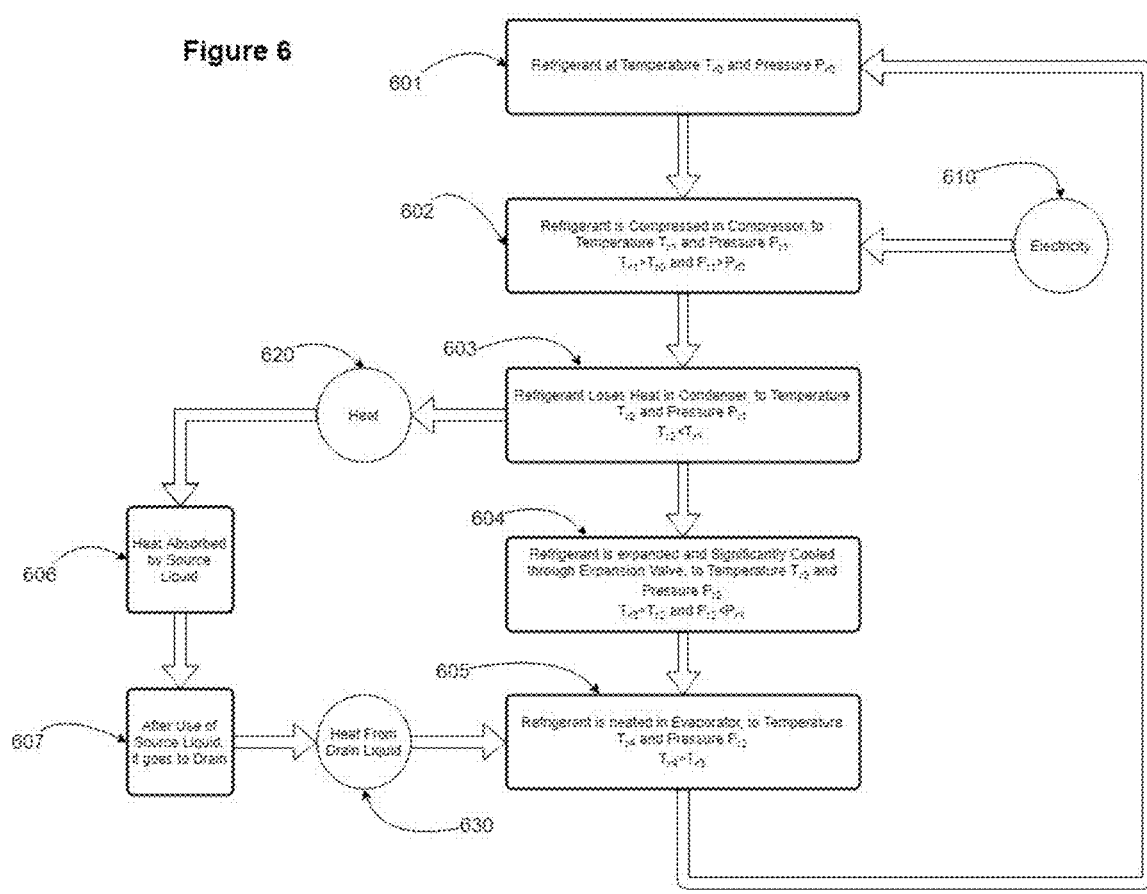
FIG. 6 is a block diagram of a general method of drain based liquid heating, according to an exemplary embodiment of the present disclosure.
Figure 7:
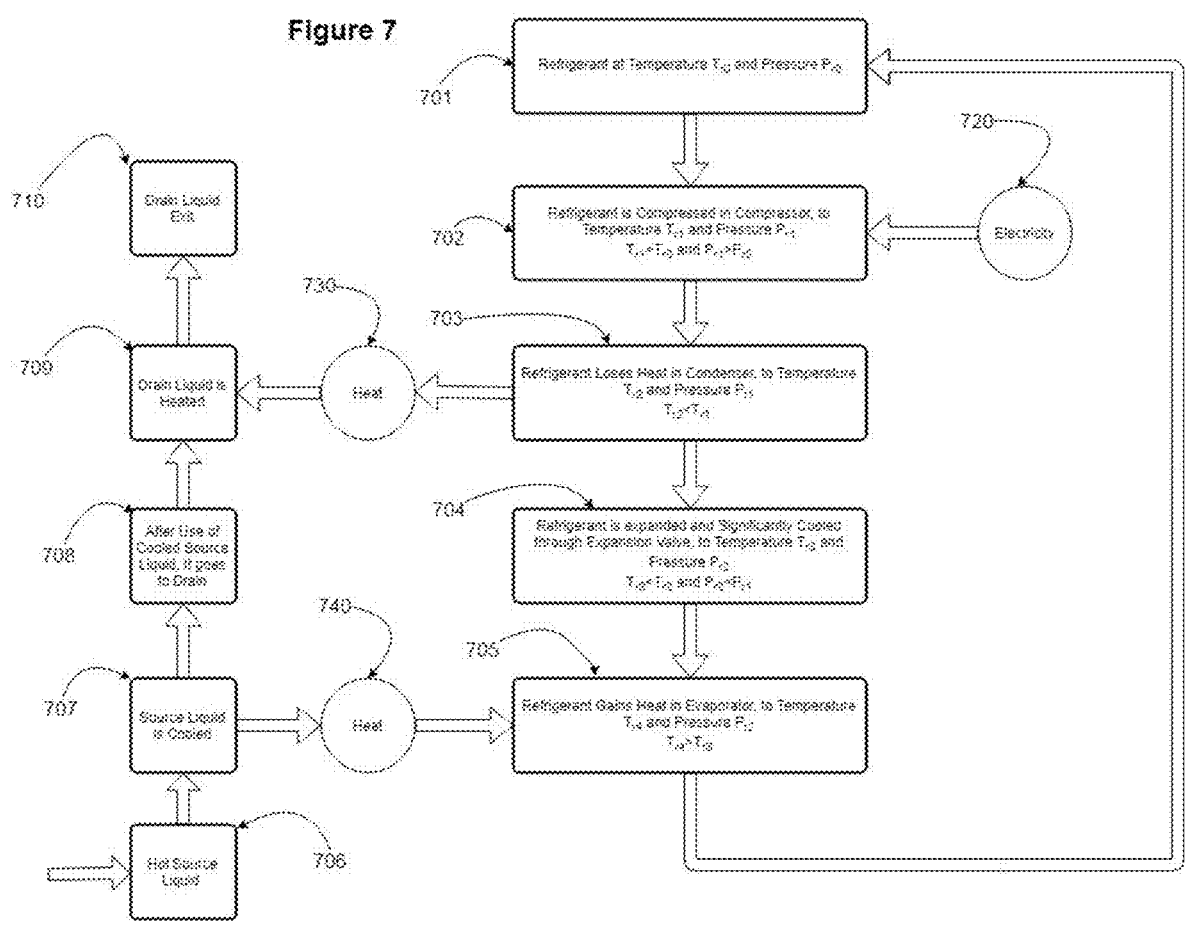
FIG. 7 is a block diagram of a general method of drain based liquid cooling, according to an exemplary embodiment of the present disclosure.

FIGS. 6 and 7 depict methods of drain based liquid heating and drain based liquid cooling, respectively, according to exemplary embodiments of the present disclosure. Thus, FIGS. 6 and 7 illustrate exemplary methods for exchanging thermal energy between two liquids for the purpose of heating and cooling, respectively.

For heating a source liquid using the heat extracted from a drain liquid, the refrigerant at temperature $T_{r0}$ and pressure $P_{r0}$ (601) may be compressed by a compressor to the pressure $P_{r1}$ and heated to temperature $T_{r1}$ (602) using electricity (610). The refrigerant may transfer the heat (620) to the source liquid (603, 606). Through this process, the refrigerant may cool to temperature $T_{r2}$ and the source liquid may heaten up. The resulting hot source liquid may be used by users (e.g., to wash hands or the body, clean dishes, use in industrial production, etc.) and may go to a drain after use (607). The cold refrigerant may undergo an expansion to the pressure $P_{r2}$ through the expansion valve (604), and this process may further cool the refrigerant to the temperature, $T_{r3}$. The drain liquid, being hotter than the refrigerant, may transfer heat (630) to the cold refrigerant (605). The refrigerant may be heated to temperature $T_{r4}$ and may return to the compressor to repeat the cycle (e.g., one or more of the steps described above for heating a source liquid).

For cooling a source liquid, the hot source liquid (706) may cool down (707) by transferring its heat (740) to the refrigerant (705). The resulting cold liquid may be used by users, and before going to the drain after use (708). Furthermore, the refrigerant at the temperature $T_{r0}$ and pressure $T_{r0}$ (701) may be compressed by compressor to the pressure $P_{r1}$ and may be heated to the temperature $T_{r1}$ (702) using electricity (720). The refrigerant may transfer the heat (730) to the drain liquid (703, 709). Thereafter, the heated drain liquid may exit (710). Through this process, the refrigerant may cool to the temperature $T_{r2}$. The cold refrigerant may undergo expansion to the pressure $P_{r2}$ through the expansion valve (704) and this may further cool the refrigerant to the temperature $T_{r3}$. The source liquid, being hotter than the refrigerant, may transfer heat (740) to the cold refrigerant (705), as discussed earlier. The refrigerant may get heated to the temperature $T_{r4}$ and may return to the compressor to repeat the cycle (e.g., one or more of the steps described above for cooling a source liquid).

Figure 8:
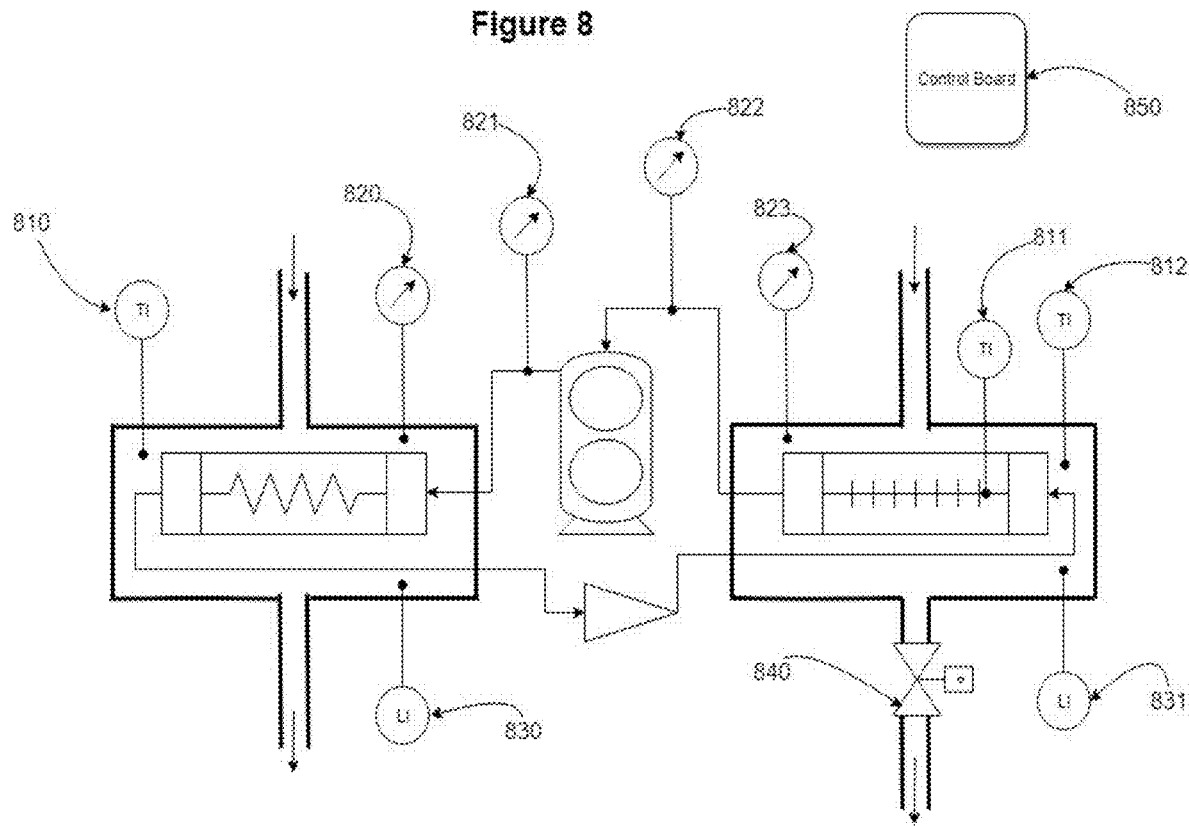
FIG. 8 depicts a pictorial and graphical diagram of the components for controls and measurements of physical properties within an exemplary liquid to liquid head pump device, according to an exemplary embodiment of the present disclosure.

FIG. 8 depicts a pictorial and graphical diagram of components for the control and/or measurement of physical properties within an exemplary liquid to liquid head pump device or system (e.g., as the system depicted in FIG. 5). Temperature sensors as indicated by TI (810, 811 and 812) may be located in the condenser chamber, on the evaporator and in the evaporator chamber. Liquid level may be measured by the liquid indicators, LI (830, 831) in the condenser chamber and evaporator chamber. Liquid flow may be measured and controlled at the exit of the evaporator chamber by the flow control valve (840). Pressure indicators (820, 821, 822) may be equipped to indicate pressure in the liquid and/or refrigerant at various points in the system for the purpose of measurement and control. A control board (850) may become a part of the system.

Figure 9:
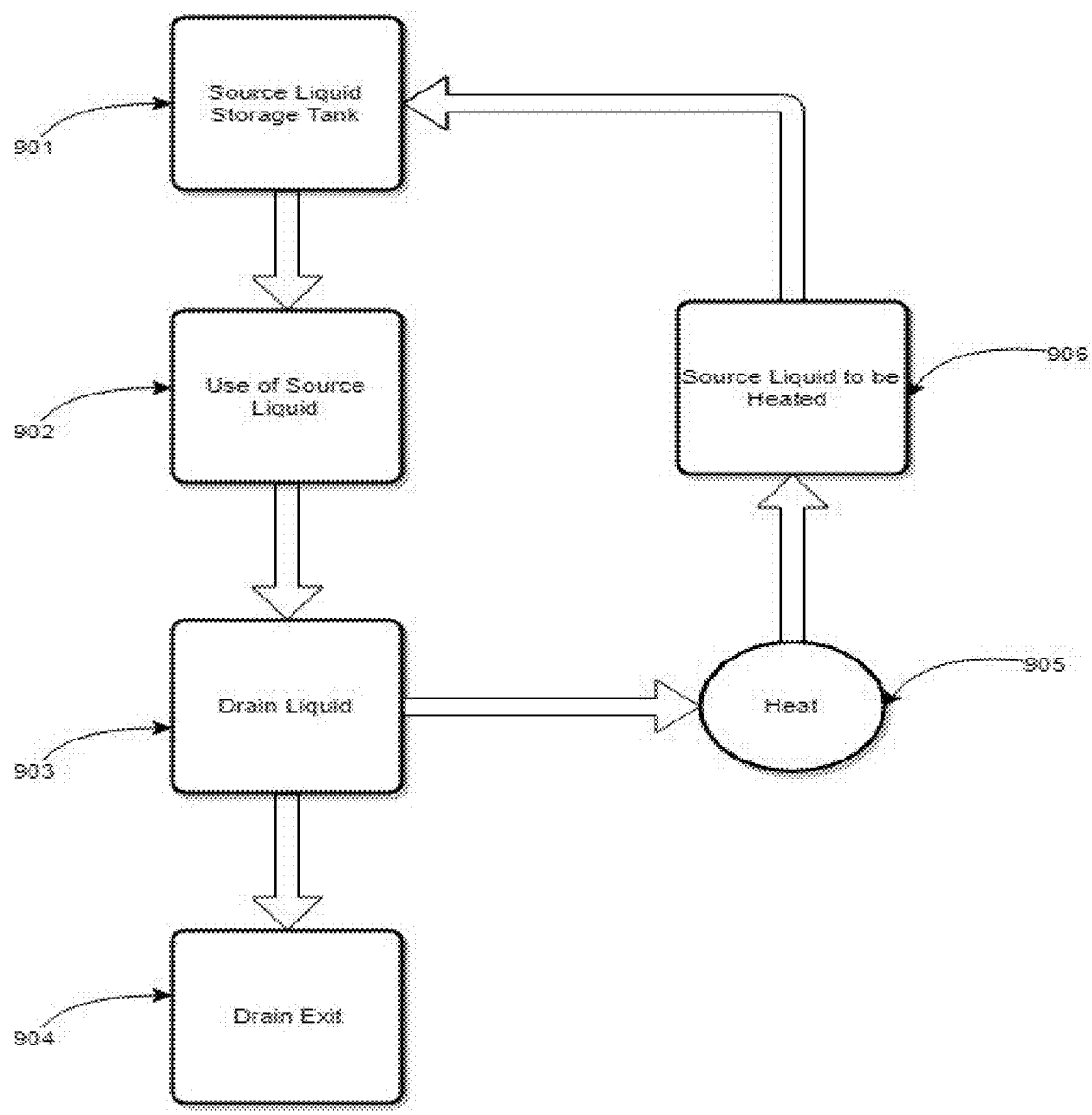
FIG. 9 is a block diagram of a general method of drain liquid based liquid heating in a storage tank using thermal energy extracted from the drain liquid, according to an exemplary embodiment of the present disclosure.

FIG. 9 is a block diagram of a method of drain liquid based liquid heating in a storage tank using thermal energy extracted from the drain liquid, e.g., using the system as depicted in FIG. 5, according to an exemplary embodiment of the present disclosure. A source liquid in a storage tank may deliver heated liquid for use (901, 902). After use of the heated liquid, the used liquid may go to the drain (903) where heat (905) may be extracted from the liquid that went down the drain ("drain liquid"). This heat may be used to heat up the incoming source liquid (906), and the resulting heated liquid may be transported to the storage tank. The drain liquid, after losing heat, may exit (904).

Figure 10:
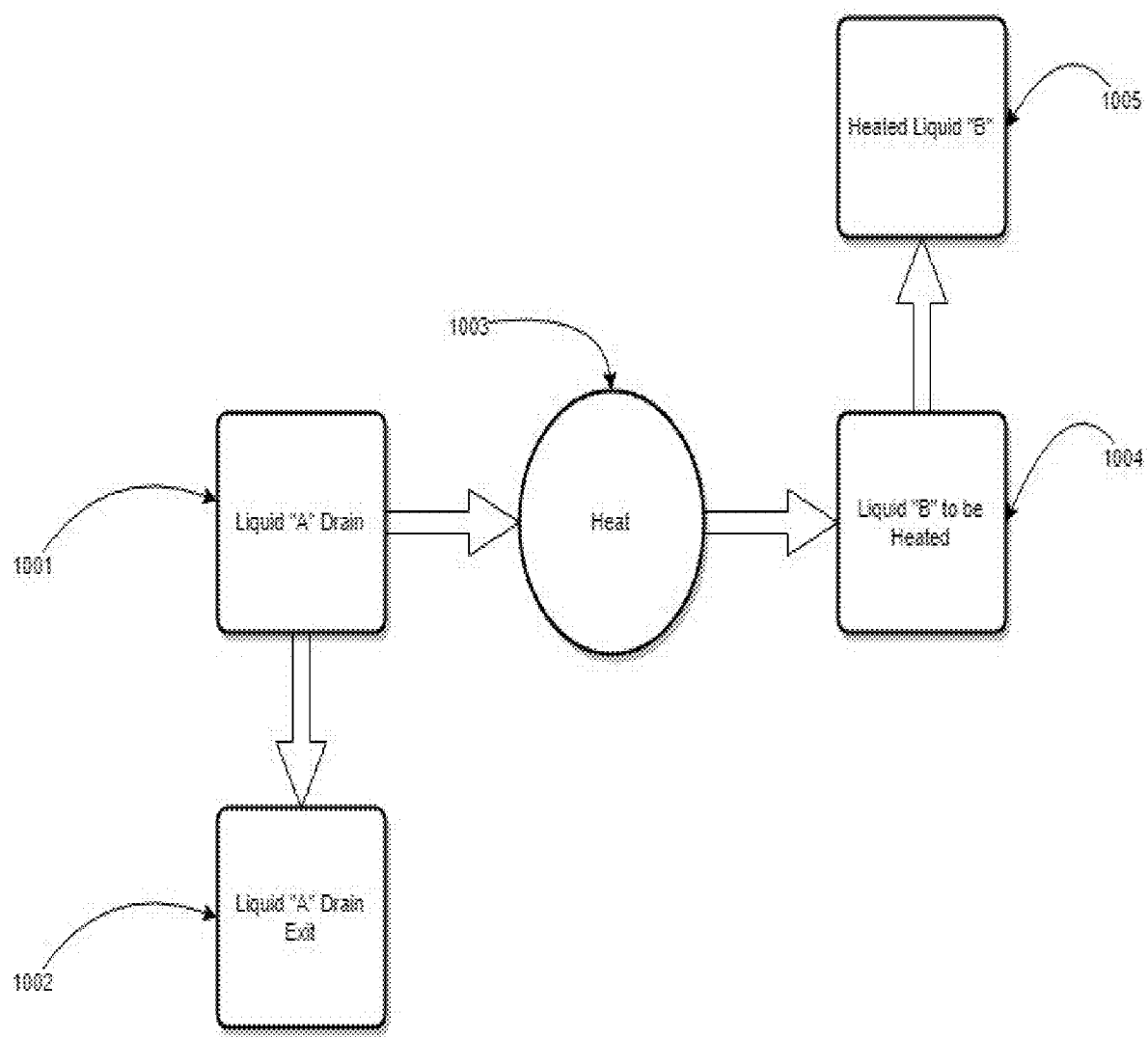
FIG. 10 is a block diagram of a general method of heating a liquid (Liquid "B") using thermal energy extracted from another liquid (Liquid "A"), according to an exemplary embodiment of the present disclosure.

FIG. 10 is a block diagram of a method of heating a liquid (Liquid "B") using thermal energy extracted from another liquid (Liquid "A"). The method may be performed by or performed using the system as depicted in FIG. 5. For example, the system may extract heat (1003) from a drain liquid (Liquid "A") having thermal energy (1001). The extracted heat may then be used to heat a second liquid (Liquid "B") (1004, 1005). Drain liquid (Liquid "A") after losing its heat may exit (1002).

Figure 11:
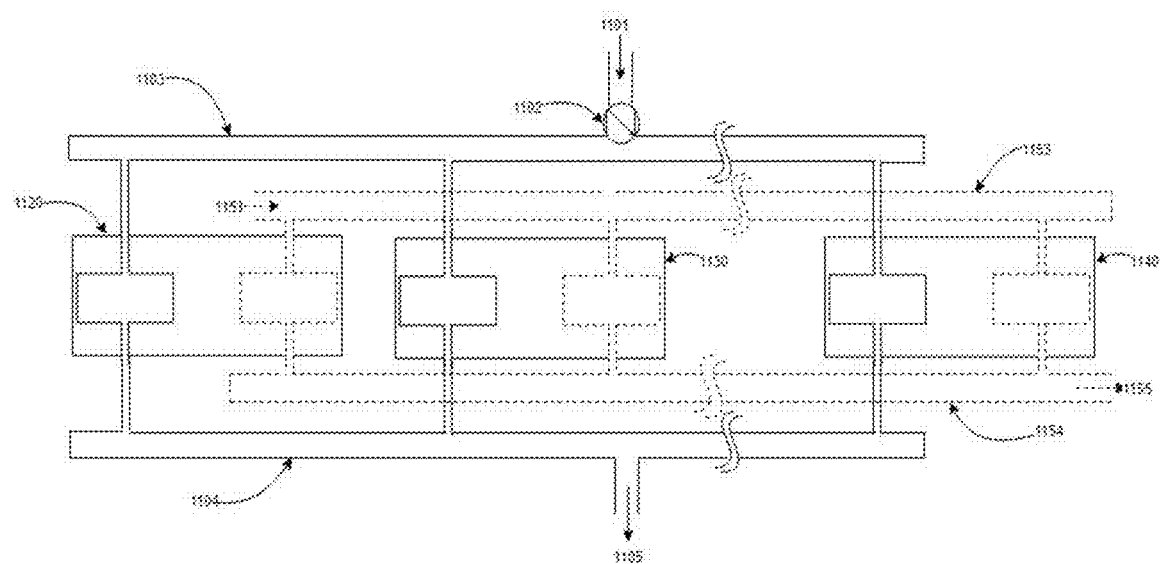
FIG. 11 depicts a pictorial and graphical diagram of a system comprising of a plurality of systems described herein (e.g., as depicted in FIG. 5) that are combined together for heating and/or cooling a source liquid, according to an exemplary embodiment of the present disclosure.

FIG. 11 depicts a pictorial and graphical diagram of a system comprising of a plurality of systems described herein (e.g., as depicted in FIG. 5) that are combined together for heating and/or cooling a source liquid, according to an exemplary embodiment of the present disclosure. Source liquid (1101) may be brought in through a check valve (1102) to a manifold (1003). The manifold may deliver the source liquid to individual inlet lines (1120, 1130, 1140) of the plurality of various systems described herein, where the liquid may receive heat, and get heated. The heated liquid from each of the outlets may flow to a manifold (1104) from where the heated liquid (1105) is delivered for use. Similarly, heated drain liquid (1151) may at first be collected to a drain manifold (1153) which delivers heated drain liquid to the individual drain inlet. After losing heat in the system, cold drain liquid (1155) may exit the system via the drain manifold (1154).

Figure 12:
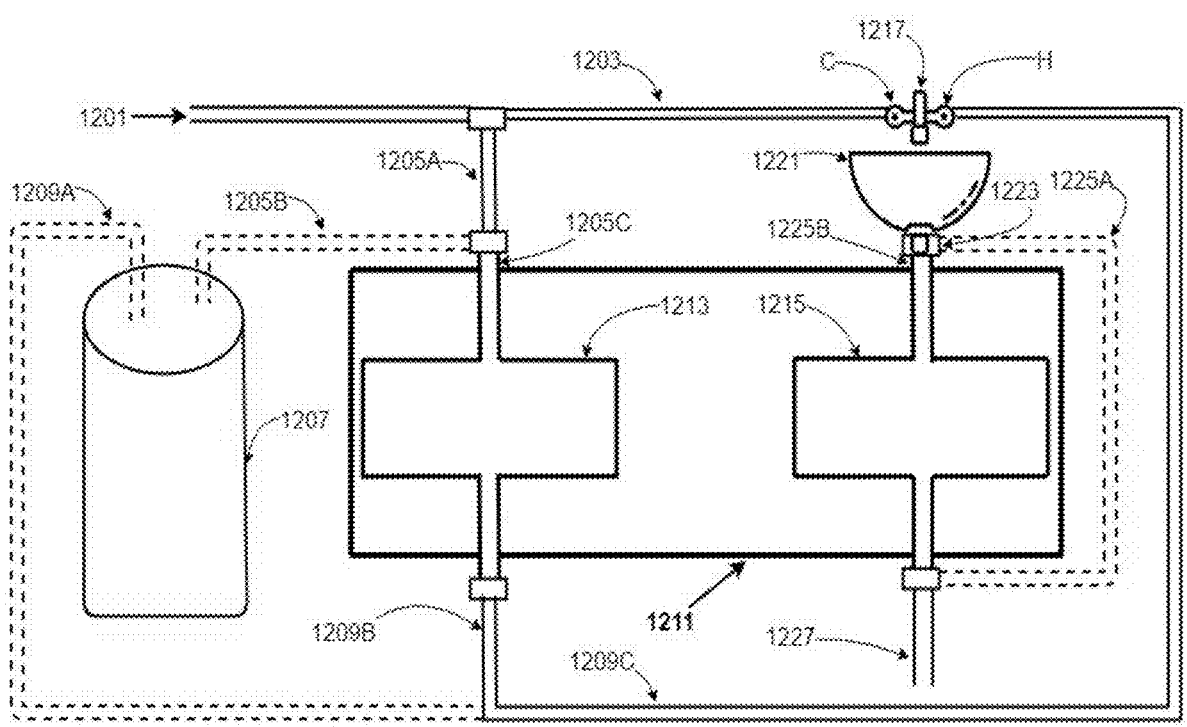
FIG. 12 depicts a pictorial and graphical diagram illustrating the assembly of a drain liquid based liquid heater (e.g., as the system depicted in FIG. 2), according to an exemplary embodiment of the present disclosure. The diagram illustrates exemplary methods for the assembly.

FIG. 12 depicts a pictorial and graphical diagram illustrating the assembly of a drain liquid based liquid heater (e.g., as the system depicted in FIG. 2), according to an exemplary embodiment of the present disclosure. The diagram illustrates exemplary methods for the assembly. The methods of assembly may be implemented on standalone residential, commercial, and industrial facilities that utilize a source liquid (e.g., water expelled from a water faucet that for use), a drain liquid (waste water expelled from a sink corresponding to the water faucet), and conventional water heaters. For clarity, the drain liquid based liquid heater being assembled or retrofitted over conventional water heating systems may be like one of the systems described above. The diagram depicts a drain liquid based liquid heater 1211, as described in the present disclosure, and a conventional water heater 1207. For clarity, conduits (e.g., pipes, coils, pathways) that lead to, lead from, or was configured for the conventional water heating (e.g., using conventional water heater 122) are shown as dashed lines while conduits (e.g., pipes, coils, pathways) leading, leading from, or configured for the drain liquid based liquid heating are shown in solid lines. FIG. 12 depicts a cold water source 1201 delivering cold water, conduit(s) 1205A and 1205B, that enable the flow of cold water from the cold water source 1201 to the (conventional) water heater 1207 that heats the cold water from the cold water to form hot water, conduit(s), 1209A and 1209C, that enable the flow of hot water from the (conventional) water heater 1207 to an outlet for the source liquid 1217 (e.g., a water faucet, shower hose, etc. 1221) and conduit(s), 1225A, 1225B, and 1227 that enable the flow of a drain liquid from an inlet (e.g., a sink) 1223. A method of assembling or retrofitting a drain liquid based water heating system (which includes drain liquid based water heater 1211) may include bifurcating or diverting conduit(s) 1205A and/or 1205B so that they enable the flow of the cold water from the cold water source 1201 to a heat exchanger 1213 of the drain liquid based liquid heater, e.g., the second heat exchanger of the drain liquid based liquid heating system described above. Thus, the bifurcated or diverted conduit 1205C carries the cold water to the heat exchanger 1213 of the drain liquid based water heater 1211. The method may further include bifurcating or diverting conduit(s) 1209A and 1209C so that they now enable the flow of the hot water from the said heat exchanger 1213 (e.g., the second heat exchanger of the drain liquid based liquid heating system described above) to the opening for the source liquid (e.g., water faucet) 1217. For example, the diverted or bifurcated conduit(s) 1209B and 1209C enable the flow of hot water from the second heat exchanger 1213 of the drain liquid based liquid heater 1211 to the to the opening for the source liquid (e.g., water faucet) 1217. Furthermore, conduit(s) 1225A and 1227 may be altered so that they enable the flow of the drain liquid through another heat exchanger 1215 of the drain liquid based liquid heater 1211 (e.g., the first heat exchanger 1215 of the drain liquid based liquid heating systems described above). The source liquid may be one or more of the cold water, the hot water, or a mixture of the cold water and the hot water. The source liquid becomes at least a part of, or the entirety of, the drain liquid after use. For example, a user may use a combination of hot and cold water to wash dirt off her hands. The collected drain liquid may be lukewarm water (a combination of the hot and cold water) mixed with the dirt.

It is contemplated similar methods presented above may be used for the assembly of a drain liquid based liquid cooler. In some embodiments, the methods of assembly or retrofitting may further include activating the transporting of the refrigerant through the cyclical pathway of a drain liquid based liquid heating system described above. The activation may be powered by an electric source (not shown).

It is contemplated that one or more components of the assembled drain liquid based liquid heating or cooling system may perform or be used to perform a method of drain liquid based liquid heating or cooling. For example, for drain liquid based liquid heating, one method may include activating the transporting of a refrigerant through a cyclical pathway comprising of two or more heat exchangers, the compressor, and the expansion valve. For example, a heat pump comprising of the above-described component may be activated, e.g., by turning on a power. The compressor may heat the refrigerant via compression, and the expansion valve may cool the refrigerant via expansion. The method may further include: receiving, at the second heat exchanger 1213, a flow or a volume of the source liquid that is desired by a user to be heated. The outlet for the source liquid 1217 may be enabled to have the source liquid flow for use by the user. For example, a faucet may be turned on, allowing water (a liquid) to flow for use by a user seeking to wash hands. An inlet 1223 may enable the drain liquid to drain down from a sink 1221. The first heat exchanger 1215 may receive a flow or a volume of the drain liquid. The method may further include facilitating the exchange of heat from the flow or the volume of the drain liquid to the refrigerant at the first heat exchanger, and facilitating the exchange of heat from the refrigerant to the flow or the volume of the source liquid received at the second heat exchanger 1213. Thus, the source liquid, as a result of the heat exchange, may be heated. The outlet for the source liquid 1217 may thus enable the flow of the heated source liquid.

Figure 13:
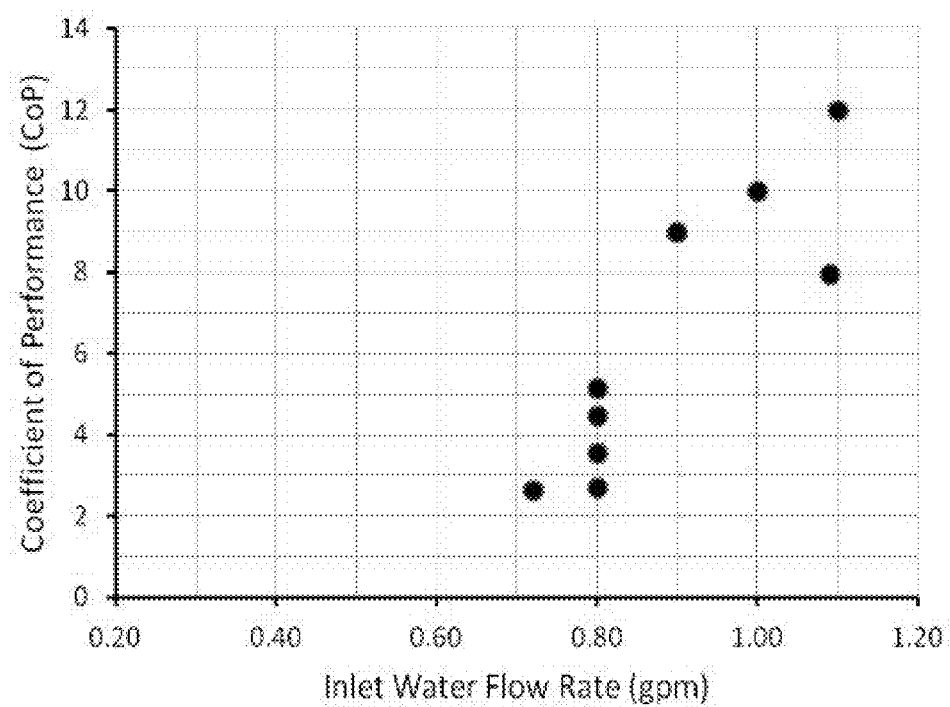
FIG. 13 depicts a graphical diagram of the experimental results obtained for a drain liquid based liquid heater (e.g., as the system depicted in FIG. 2), according to an exemplary embodiment of the present disclosure. The results are depicted as Coefficient of Performance (CoP) of the system for various inlet water flow rates.

FIG. 13 depicts a graphical diagram of the experimental results obtained for the system as disclosed embodiment depicted in FIG. 2. The results are shown as Coefficient of Performance (COP) of the system for various inlet water flow rates in gallons per minute (gpm). A COP may be an indicia of performance of a heat pump, heat pump facility, or a system applying or utilizing a heat pump. For example, a COP may be a ratio of useful heating or cooling provided to work required. Higher COPs may relate to lower operating costs. The COP may usually exceed 1, especially in heat pumps, because, instead of just converting work to heat (which, if 100% efficient, would be a COP of 1), it pumps additional heat from a heat source to where the heat may be needed. The results for the CoP exceeding one(1) may indicate that the heat energy received by the source water is more than the input energy into the system consisting the drain water.

It will be understood that each of the elements described above, or two or more together may also find a useful application in other types of apparatus and methods differing from the type described above.

While certain novel features of this disclosure have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present disclosure. Of particular note, this disclosure covers embodiments where other liquids instead of liquid are being used.

Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure.

What is claimed is:

1. A system comprising:
a refrigerant;
a source liquid and a drain liquid, wherein there is a temperature differential between the source liquid and the drain liquid;
two or more heat exchangers, the two or more heat exchangers comprising at least:
a first heat exchanger that facilitates an exchange of thermal energy from the drain liquid to the refrigerant, and
a second heat exchanger that facilitates an exchange of thermal energy from the refrigerant to the source liquid; and
a means for transporting the refrigerant in a cyclical pathway comprising the two or more heat exchangers.

2. The system of claim 1, further comprising:
a compressor that heats the refrigerant via compression, and
an expansion valve that cools the refrigerant via expansion; and
wherein the cyclical pathway further comprises the compressor and the expansion valve.

3. The system of claim 1, wherein the first heat exchanger is an evaporator chamber comprising an evaporator, and at least an inlet for the drain liquid.

4. The system of claim 3, wherein the evaporator chamber further comprises at least an outlet for the drain liquid.

5. The system of claim 1, wherein the second heat exchanger is a condenser chamber comprising a condenser, and at least an inlet for the source liquid.

6. The system of claim 5, wherein the condenser chamber further comprises at least an outlet for the source liquid.

7. The system of claim 1, wherein the means for transporting the refrigerant in a cyclical pathway comprises of a coil spanning the cyclical pathway, and wherein the coil includes, as one or more segments of its cyclical pathway, a compressor and an expansion valve.

8. The system of claim 1, wherein the source liquid becomes at least a part of, or the entirety of, the drain liquid after use.

9. The system of claim 1, further comprising a refrigerant filter.

10. The system of claim 2, further comprising:
one or more sensors for measuring one or more of a temperature, a pressure, or a flow rate within one or more of: a means for carrying the source liquid or the drain liquid, the cyclical pathway, the heat exchangers, the compressor, or the expansion valve.

11. The system of claim 10, further comprising:
a controller for controlling one or more of the temperature, the pressure, or the flow rate within the one or more of: the means for carrying the source liquid or the drain liquid, the cyclical pathway, the heat exchangers, the compressor, or the expansion valve.

12. The system of claim 2, further comprising a heat pump comprising the refrigerant, the means for transporting the refrigerant, the compressor, the expansion valve, and the heat exchangers.

13. The system of claim 12, wherein one or more components of the heat pump is powered on by an electric source on demand.

14. The system of claim 13, wherein the electric source is a renewable energy source, and further comprising:
a rechargeable battery to store electricity from the renewable energy source.

15. The system of claim 1, further comprising a reversing valve to reverse the flow of the refrigerant.

16. A method for heating or cooling at least one source liquid by exchanging thermal energy between at least one drain liquid and the at least one source liquid in one or more heat pump systems, the method comprising:
activating transport of a refrigerant through a cyclical pathway,
wherein the cyclical pathway comprises two or more heat exchangers, a compressor, and an expansion valve,
wherein the activation is powered by an electric source,
wherein the two or more heat exchangers comprises at least a first heat exchanger and a second heat exchanger, and
wherein the compressor heats the refrigerant via compression, and the expansion valve cools the refrigerant via expansion;
receiving, at the second heat exchanger, a volume of the at least one source liquid that is desired by a user to be heated;

enabling, at an outlet for the source liquid, the use of the volume of the at least one source liquid for use by the user;

enabling, at an inlet for the drain liquid, the volume of the at least one source liquid to become at least a part of, or the entirety of, the drain liquid after the use;

receiving, at the first heat exchanger, a volume of the drain liquid;

facilitating the exchange of heat from the volume of the drain liquid to the refrigerant at the first heat exchanger;

facilitating the exchange of heat from the refrigerant to the volume of the at least one source liquid received at the second heat exchanger.

17. The method of claim 16, wherein the volume of the at least one source liquid is used by the user after receiving heat from the refrigerant.

18. A system comprising:

a refrigerant;

a source liquid and a drain liquid, wherein there is a temperature differential between the source liquid and the drain liquid;

two or more heat exchangers, the two or more heat exchangers comprising at least:
  a first heat exchanger that facilitates an exchange of thermal energy from the drain liquid to the refrigerant, said first heat exchanger comprising a liquid-to-refrigerant heat exchanger having an inlet for receipt of the drain liquid ,and
  a second heat exchanger that facilitates an exchange of thermal energy from the refrigerant to the source liquid; and a means for transporting the refrigerant in a cyclical pathway comprising of the two or more heat exchangers.

* * * * *